United States Patent
Kuo et al.

(10) Patent No.: US 9,203,187 B2
(45) Date of Patent: Dec. 1, 2015

(54) HOT PLUG STRUCTURE OF ELECTRONIC PERIPHERAL DEVICE

(71) Applicant: AIC INC., Taoyuan Hsien (TW)

(72) Inventors: Chung-I Kuo, Taoyuan Hsien (TW); Lin-Kuei Tsai, Taoyuan Hsien (TW)

(73) Assignee: AIC INC., Taoyuan Hsien (TW)

( * ) Notice: Subject to any disclaimer, the term of this patent is extended or adjusted under 35 U.S.C. 154(b) by 30 days.

(21) Appl. No.: 14/248,270

(22) Filed: Apr. 8, 2014

(65) Prior Publication Data

US 2015/0288098 A1 Oct. 8, 2015

(51) Int. Cl.
  *H01R 13/62* (2006.01)
  *H01R 13/629* (2006.01)
  *H01R 13/516* (2006.01)

(52) U.S. Cl.
  CPC ........ *H01R 13/62977* (2013.01); *H01R 13/516* (2013.01); *H01R 13/62933* (2013.01)

(58) Field of Classification Search
  CPC ................................................ H01R 13/62977
  See application file for complete search history.

(56) References Cited

U.S. PATENT DOCUMENTS

| | | | | |
|---|---|---|---|---|
| 5,051,101 A * | 9/1991 | Komatsu | ...................... | 439/159 |
| 5,325,263 A * | 6/1994 | Singer et al. | ............. | 361/679.39 |
| 5,483,419 A * | 1/1996 | Kaczeus et al. | .......... | 361/679.39 |
| 5,721,669 A * | 2/1998 | Becker et al. | ............ | 361/679.31 |
| 6,045,377 A * | 4/2000 | Kajiura | ......................... | 439/159 |
| 6,077,099 A * | 6/2000 | Pei et al. | ...................... | 439/342 |
| 6,428,338 B1 * | 8/2002 | Yasufuku et al. | ............. | 439/310 |
| 6,544,061 B1 * | 4/2003 | Yasufuku et al. | ............. | 439/310 |
| 7,090,518 B1 * | 8/2006 | Osada et al. | ................... | 439/157 |
| 2013/0313955 A1 * | 11/2013 | Kuo | .............................. | 312/326 |
| 2014/0111077 A1 * | 4/2014 | Kuo | .............................. | 312/333 |
| 2014/0346298 A1 * | 11/2014 | Tsai | ........................... | 248/224.8 |
| 2014/0374366 A1 * | 12/2014 | Tsai | ............................... | 211/26 |

* cited by examiner

*Primary Examiner* — James Harvey
(74) *Attorney, Agent, or Firm* — Chun-Ming Shih; HDLS IPR Services (57) ABSTRACT

A hot plug structure of an electronic peripheral device has a connecting port. The hot plug structure includes a base having a linear way, a support connected to the base and moveable along the linear way in which the electronic peripheral device is fixed on the support, a connector installed on the base and disposed corresponding to one side of the linear way, and a rotating part disposed corresponding to the other side of the linear way. The rotating part has a first pivot portion pivoted around the base and a second pivot portion pivoted around the support. The rotating part can be rotated to drive the support close to or away from the connector such that the connecting port is plugged in or unplugged from the connector. Therefore, the connection efficiency and use convenience of the hot plug structure are improved.

11 Claims, 6 Drawing Sheets

HOT PLUG STRUCTURE OF ELECTRONIC PERIPHERAL DEVICE

BACKGROUND OF THE INVENTION

1. Field of the Invention

The present invention relates to a hot plug structure of an electronic peripheral device and, in particular, to a hot plug structure used to fix an electronic peripheral device such as a power supply and a hard disk drive.

2. Description of Related Art

With the substantial development of computer technology, the design, manufacturing, and assembly of computer equipment advance accordingly. To allow the user to change, repair, or upgrade the electronic peripheral device such as a power supply and a hard disk drive by themselves, the electronic peripheral device is usually fixed to the supporting frame of the computer equipment using screws. Thus, the user can quickly install/uninstall the electrical peripheral device in/from the supporting frame by themselves.

A traditional method of fixing the electronic peripheral device to the supporting frame by screws is as follows. First, the electronic peripheral device is electrically connected to the connector on the supporting frame and some screws and appropriate hand tools are provided; the screws are then placed, one by one, through the respective holes formed on the electronic peripheral device and the supporting frame. After that, the hand tools are used to drive the screws. Thus, the screws and the holes are combined firmly and the electronic peripheral device is positioned to the supporting frame well.

However, the above method has the following disadvantages. First, the electronic peripheral device and the connector don't have the effect of quick plugging/unplugging. Second, the hand tools are required for the installation/uninstallation of the electronic peripheral device to attach/detach the screws one by one. Therefore, the additional requirement of appropriate tools and the tedious process are inconvenient for the vendor or user. Third, after the screws are detached, the individual screws are not easy to keep and easy to miss due to small volume, failing to continue the subsequent assembling process.

In view of foregoing, the inventor pays special attention to research with the application of related theory and tries to overcome the above disadvantages regarding the above related art, which becomes the goal of the inventor's improvement.

SUMMARY OF THE INVENTION

The present invention is to provide a hot plug structure of an electronic peripheral device, which uses the rotation of a rotating part to drive the support close to or away from the connector such that the connecting port is plugged in or is unplugged from the connector. Thus, the connection efficiency and use convenience of the hot plug structure are improved.

The present invention provides a hot plug structure of an electronic peripheral device having a connecting port, the hot plug structure comprising:

a base having a linear way;

a support connected to the base and moveable along the linear way, wherein the electronic peripheral device is fixed on the support;

a connector installed on the base and disposed corresponding to one side of the linear way; and a rotating part disposed corresponding to the other side of the linear way, wherein the rotating part has a first pivot portion pivoted around the base and a second pivot portion pivoted around the support, wherein the rotating part drives the support close to or away from the connector such that the connecting port is plugged in or is unplugged from the connector.

The present invention also has the following effects.

First, the user can rotate the rotating part to drive the connecting port to be plugged in or unplugged from the connector, enabling the electronic peripheral device to be plugged in or unplugged from the connector quickly. Thus, the connection efficiency and use convenience of the hot plug structure are improved.

Second, during the installation/uninstallation of the electronic peripheral device of the present invention on/from the support, no auxiliary tools and disassembly devices are required. Thus, there are no issues of tedious installation/uninstallation processes and easily losing screws, enabling the hot plug structure to achieve improved efficiency of installation/uninstallation and use convenience.

Third, the support has a latch portion; the rotating part has an engaging portion; the engaging portion can be latched in the latch portion correspondingly such that the support is locked by the rotating part and cannot move. Also, the support is kept at the place where the connector is plugged in the connecting port such that the electronic peripheral device is electrically connected to the connector stably.

Fourth, the present invention can avoid direct contact and induced friction between the base and the support when the rotating part rotates, enhancing the smoothness of rotation of the rotating part.

DETAILED DESCRIPTION OF THE INVENTION

The detailed description and technical details of the present invention will be explained below with reference to accompanying figures. However, the accompanying figures are only for explanation, but not to limit the scope of the present invention.

Please refer to FIGS. 1-6. The present invention provides a hot plug structure of an electronic peripheral device. The hot plug structure 10 comprises a base 1, a support 2, a connector 3, and a rotating part 4.

The electronic peripheral device 100 may be a power supply or a hard disk drive. A preferred example of the electronic peripheral device 100 is a hard disk drive, but not limited to this. The electronic peripheral device 100 has a connecting port 101.

Figure 1:
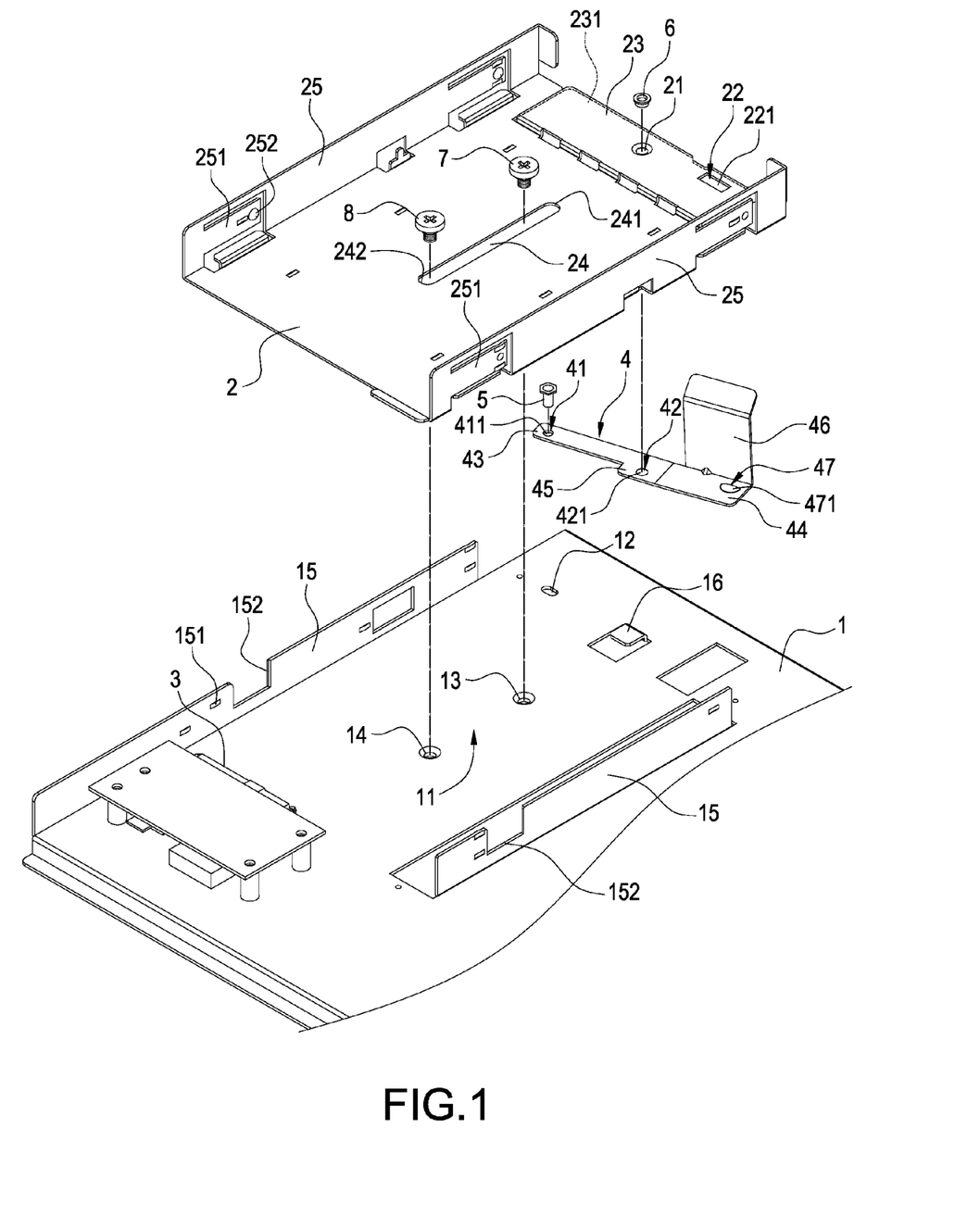
FIG. 1 is a perspective exploded view of the hot plug structure of the present invention.
Figure 2:
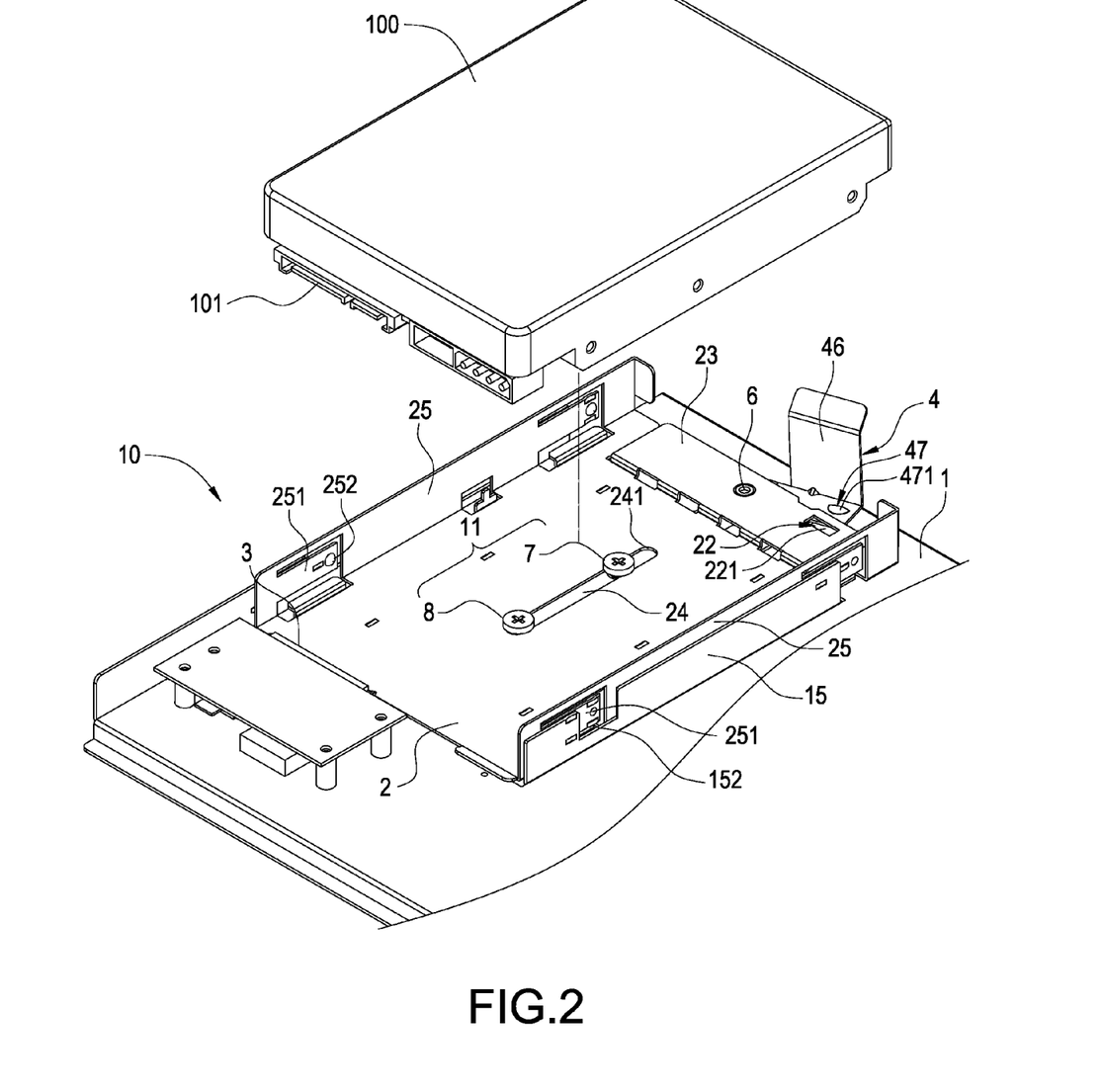
FIG. 2 is a perspective assembled view of the hot plug structure of the present invention.

As shown in FIGS. 1 and 2, the base 1 has a linear way 11. Also, the base 1 has a through-hole 12, a first fixing hole 13, and a second fixing hole 14. The first fixing hole 13 and the second fixing hole 14 are disposed in parallel.

In addition, the base 1 extends to form two opposite upright plates 15 and a stopping block 16. The two opposite upright plates 15 are disposed in parallel with the rail direction of the linear way 11 and have two opposite protrusions 151 and two opposite cuts 152. The protrusion 151 and the cut 152 on each of the upright plates 15 may be plural in number, but not limited to that of the current embodiment.

As shown in FIGS. 1 and 2, the support 2 is connected to the base 1 and moveable along the linear way 11. The electronic peripheral device 100 is fixed on the support 2 and moves with the support 2. A detailed explanation is given below.

The support 2 has a through-hole 12 and a latch portion 22. Also, the support 2 extends away from the base 1 to form a protruding plate 23 and a recess 231 is formed between the base 1 and the protruding plate 23. The latch portion 22 is a latch slot 221 formed on the support 2.

Further, the support 2 has a through slot 24. A first inner edge 241 and a second inner edge 242 are formed at two ends of the through slot 24 of the support 2, respectively.

Moreover, two side plates 25 extend from two ends of the support 2 and are disposed inside of the two upright plates 15. The two side plates 25 have two opposite spring members 251. Each of the spring members 251 extends away from the corresponding upright plate 15 to form a bump 252. The two protrusions 151 can contact against the two spring members 251. The protrusion 151 on each of the side plates 25 may be plural in number, but not limited to that of the current embodiment.

As shown in FIGS. 1 and 2, the connector 3 is installed on the base 1 and disposed corresponding to one side of the linear way 11. The connector 3 is used for the electrical connection with the electronic peripheral device 100 and for information communication.

As shown in FIGS. 1 and 2, a rotating part 4 is disposed corresponding to the other side of the linear way 11. The rotating part 4 has a first pivot portion 41 pivoted around the base 1 and a second pivot portion 42 pivoted around the support 2. In this way, the user can rotate the rotating part 4 to drive the support 2 close to or away from the connector 3 such that the connecting port 101 is plugged in or unplugged from the connector 3. A further explanation is given below.

The rotating part 4 can be received in the recess 231 and fitted between the base 1 and the support 2. Also, the base 1 extends towards the recess 231 to form a stopping block 16 which can stop the rotating part 4.

Besides, the rotating part 4 has a first end 43, a second end 44 opposite to the first end 43, and a middle portion 45 formed between the first end 43 and the second end 44. The first pivot portion 41 is formed at the first end 43; the second pivot portion 42 is formed on the middle portion 45. The rotating part 4 extends from the second end 44 to form a toggle plate 46. The rotating part 4 has an engaging portion 47 which can be latched in the latch portion 22 correspondingly.

Further, when the engaging portion 47 is latched in the latch portion 22, the connecting line L2 defined by the first end 43 and the second end 44 is disposed vertical to the rail direction of the linear way 11 in which the engaging portion 47 is a latch 471 extending from the rotating part 4 and the latch 471 can be latched in the latch slot 221 correspondingly.

Also, the first pivot portion 41 is a first opening 411 formed at the first end 43. The second pivot portion 42 is a second opening 421 formed on the middle portion 45.

As shown in FIGS. 1 and 2, the hot plug structure 10 of the present invention further comprises a first pivot pin 5 and a second pivot pin 6. The first pivot pin 5 is pivoted into the first opening 411 and the through-hole 12; the second pivot pin 6 is pivoted into the hole 21 and the second opening 421. In the current embodiment, the first pivot pin 5 and the second pivot pin 6 are rivets, but not limited to this. The first pivot pin 5 and the second pivot pin 6 may be similar components such as screws and bolts.

As shown in FIGS. 1 and 2, the hot plug structure 10 of the present invention further comprises a first fastener 7 and a second fastener 8. The linear way 11 is composed of the first fastener 7 passing in and fixed to the first fixing hole 13 and the second fastener 8 passing in and fixed to the second fixing hole 14. The rail direction of the linear way 11 is a connecting line L1 defined by the first fastener 7 and the second fastener 8.

Besides, the support 2 is hitched to the externals of the first fastener 7 and the second fastener 8 via a through slot 24 and is moveable with respect to the first fastener 7 and the second fastener 8. The first inner edge 241 and the first fastener 7 can engage with each other. The second inner edge 242 and the second fastener 8 can engage with each other.

As shown in FIGS. 3-6, the assembly of the hot plug structure 10 of the present invention is described below. The base 1 has a linear way 11. The support 2 is connected to the base 1 and moveable along the linear way 11 in which the electronic peripheral device 100 is fixed on the support 2. The connector 3 is installed on the base 1 and disposed corresponding to one side of the linear way 11. The rotating part 4 is disposed corresponding to the other side of the linear way 11. The rotating part 4 has a first pivot portion 41 pivoted around the base 1 and a second pivot portion 42 pivoted around the support 2. The rotating part 4 drives the support 2 close to or away from the connector 3 such that the connecting port 101 is plugged in or is unplugged from the connector 3. In this way, the connection efficiency and use convenience of the hot plug structure 10 are improved.

FIGS. 3-6 show the hot plug structure 10 of the present invention in operation. The first pivot portion 41 is pivoted around the base 1 and the second pivot portion 42 is pivoted around the support 2. In this way, a linkage component is formed among the base 1, the support 2, and the rotating part 4 such that when the user rotates the rotating part 4, the rotating part 4 can drive the support 2 to move with respect to the base 1.

Further, the hot plug structure 10 has two preset positions. The first preset position is the place where the first inner edge 241 and the first fastener 7 engage with each other; the second preset position is the place where the second inner edge 242 and the second fastener 8 engage with each other. Also, the connecting line L2 defined by the first end 43 and the second end 44 is disposed vertical to the rail direction of the linear way 11.

Figure 3:
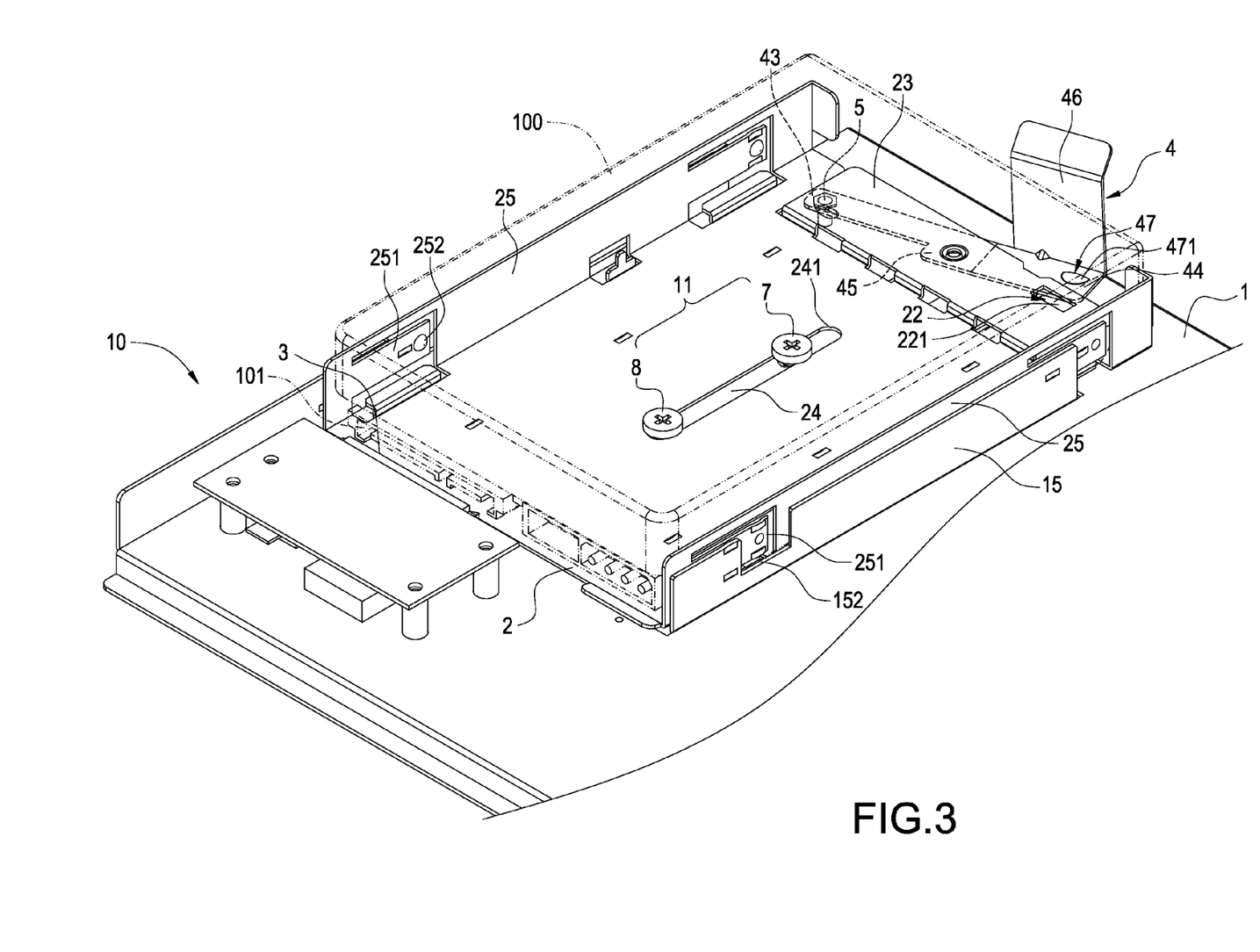
FIG. 3 is a perspective view of the hot plug structure of the present invention in operation.
Figure 4:
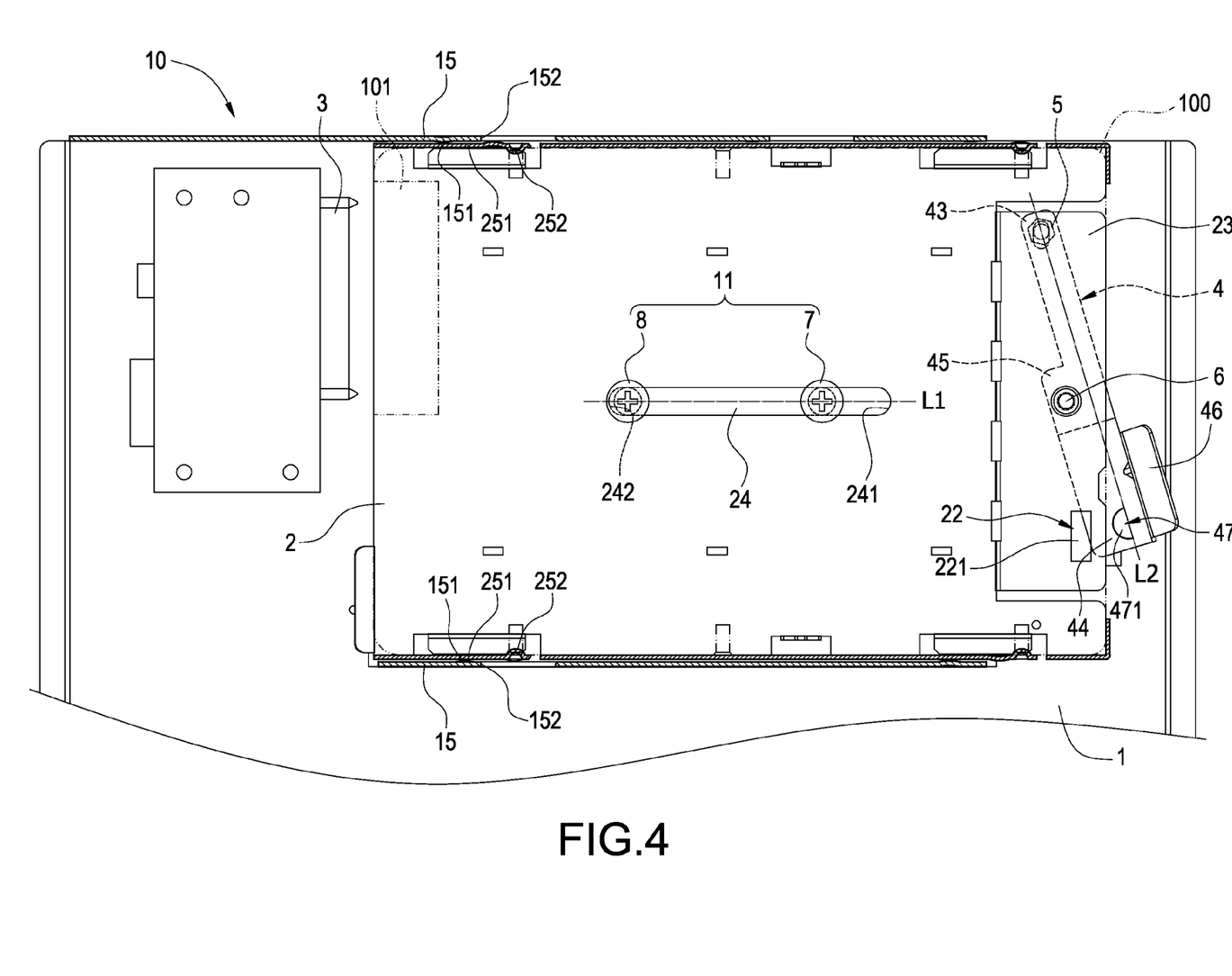
FIG. 4 is a top view of the hot plug structure of the present invention in operation.
Figure 5:
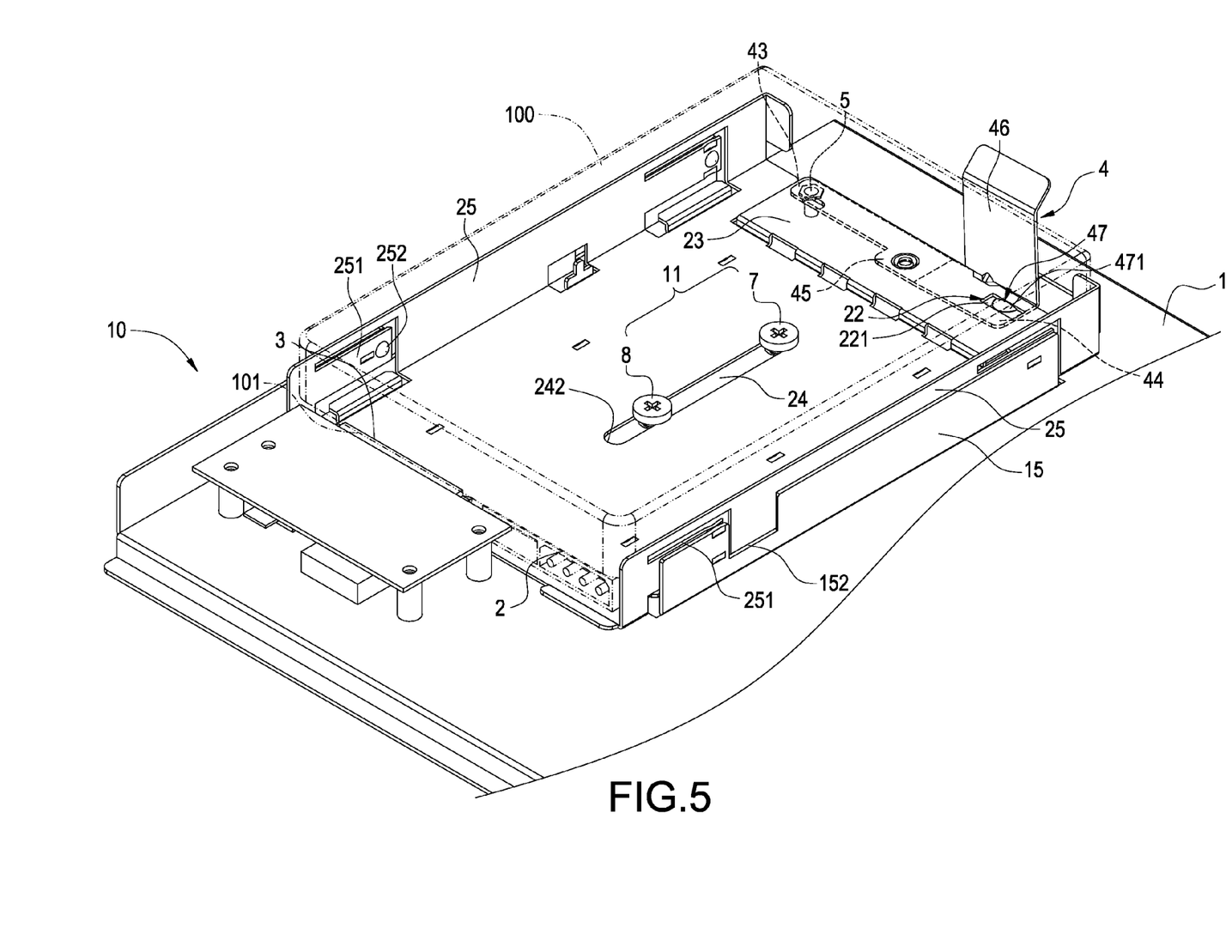
FIG. 5 is another perspective view of the hot plug structure of the present invention in operation.
Figure 6:
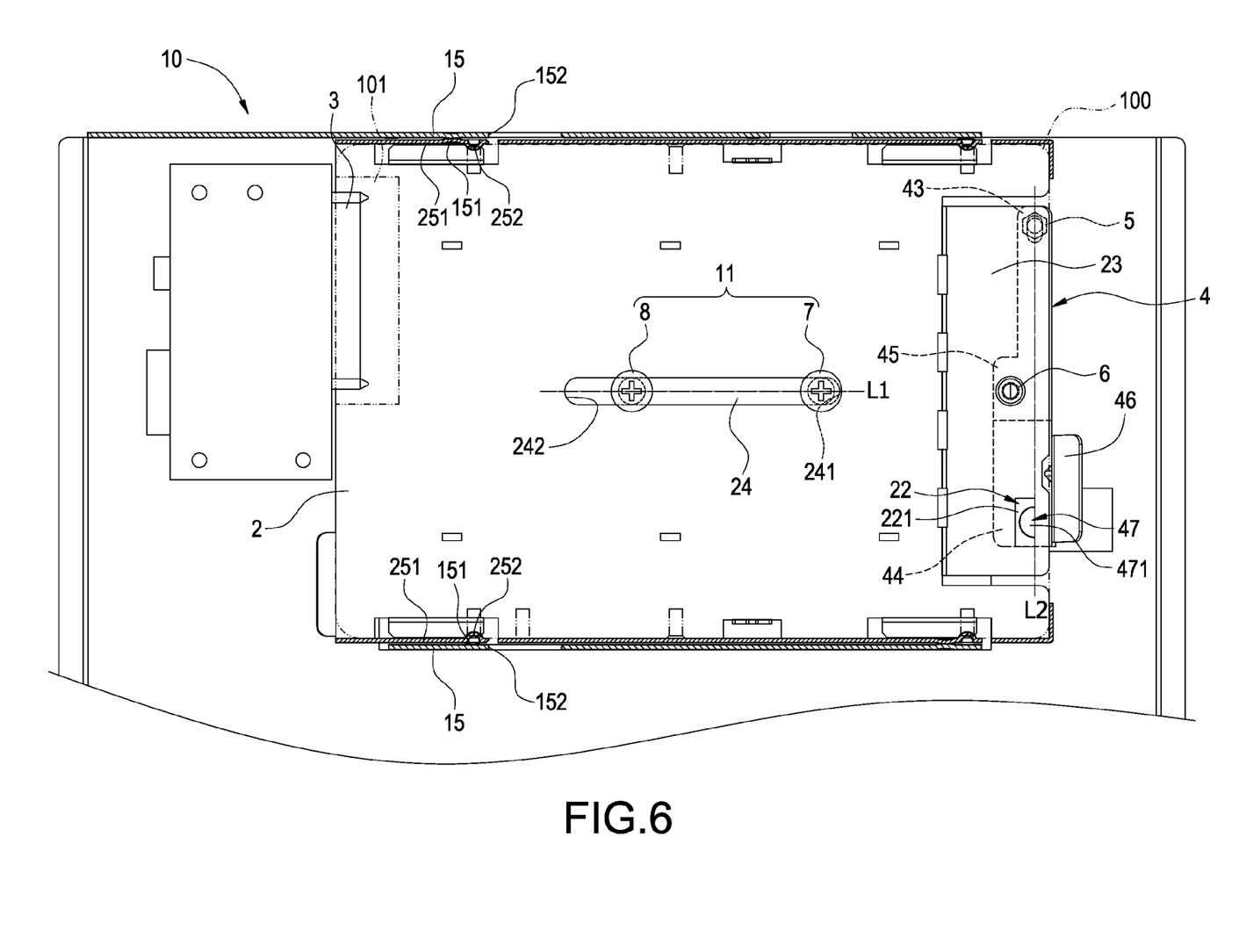
FIG. 6 is another top view of the hot plug structure of the present invention in operation.

Therefore, as shown in FIGS. 3 and 4, when the rotating part 4 rotates away from the base 1, the rotating part 4 will drive the support 2 to move to the second preset position and away from the connector 3. Because the electronic peripheral device 100 moves with the support 2, the rotating part 4 will also drive the connecting port 101 to be unplugged from the connector 3. As shown in FIGS. 5 and 6, when the rotating part 4 rotates towards the base 1, the rotating part 4 will drive the support 2 to move to the first preset position and close to the connector 3. Because the electronic peripheral device 100 moves with the support 2, the rotating part 4 will also drive the connecting port 101 to be plugged in the connector 3. Thus, the user can rotate the rotating part 4 to drive the connecting port 101 to be plugged in or unplugged from the connector 3, enabling the electronic peripheral device 100 to be plugged in or unplugged from the connector 3 quickly. In this way, the plugging efficiency and use convenience of the hot plug structure 10 and the electronic peripheral device 100 are improved.

In addition, the assembly of the traditional electronic peripheral device and the support uses the hand tools and screws. However, in the present invention, two upright plates 15 of the base 1 have two opposite protrusions 151 and two opposite cuts 152. The two side plates 25 have two opposite spring members 251. Each of the spring members 251 extends away from the corresponding upright plate 15 to form a bump 252. As shown in FIGS. 3 and 4, when the rotating part 4 drives the support 2 to move to the second preset position, the spring member 251 is disposed corresponding to the cut 152, making the spring member 251 be able to move towards the cut 152. Because the spring member 251 is pushed by the electronic peripheral device 100 to be moveable towards the cut 152, the two spring members 251 cannot clamp the electronic peripheral device 100. As a result, the electronic peripheral device 100 can be freely detached from the support 2. As shown in FIGS. 5 and 6, when the rotating part 4 drives the support 2 to move to the first preset position, the spring member 251 is disposed corresponding to the protrusion 151. The two protrusions 151 can contact against the two spring members 251, causing the two spring members 251 to move inwards to clamp the electronic peripheral device 100. As a result, the electronic peripheral device 100 is installed and fixed on the support 2 by means of clamping. Therefore, during the installation/uninstallation of the electronic peripheral device 100 on/from the support, no auxiliary tools and disassembly devices are required and there are no issues of tedious installation/uninstallation processes and easily losing screws, enabling the hot plug structure 10 to achieve improved efficiency of installation/uninstallation and use convenience.

Moreover, the support 2 has a latch portion 22; the rotating part 4 has an engaging portion 47. When the rotating part 4 drives the support 2 to move to the first preset position, the engaging portion 47 is latched in the latch portion 22 correspondingly such that the support 2 is locked by the rotating part 4 and cannot move and the support 2 is kept at the place where the connector 3 is plugged in the connecting port 101. Accordingly, the separation of the connector 3 from the connecting port 101 can be prevented when subject to impact or vibration, ensuring a stable electrical connection between the electronic peripheral device 100 and the connector 3.

Also, the support 2 extends away from the base 1 to form a protruding plate 23 and a recess 231 is formed between the base 1 and the protruding plate 23. The base 1 extends towards the recess 231 to form a stopping block 16. The rotating part 4 can be received in the recess 231 and stopped by the stopping block 16 such that there is a spacing between the rotating part 4 and the base 1 and between the rotating part 4 and the support 2, which avoids direct contact and induced friction between the base 1 and the support 2 when the rotating part 4 rotates. Thus, the smoothness of rotation of the rotating part 4 is enhanced.

In summary, the hot plug structure of an electronic peripheral device of the present invention can achieve the expected objective and overcome the disadvantages of the prior art. Also it is indeed novel, useful, and non-obvious to be patentable. Please examine the application carefully and grant it as a formal patent for protecting the rights of the inventor.

What is claimed is:

1. A hot plug structure (10) of an electronic peripheral device (100) having a connecting port (101), the hot plug structure (10) comprising:
a base (1) having a linear way (11);
a support (2) connected to the base (1) and moveable along the linear way (11),
wherein the electronic peripheral device (100) is fixed on the support (2);
a connector (3) installed on the base (1) and disposed corresponding to one side of the linear way (11); and
a rotating part (4) disposed corresponding to the other side of the linear way (11),
wherein the rotating part (4) has a first pivot portion (41) pivoted around the base (1) and a second pivot portion (42) pivoted around the support (2);
wherein the rotating part (4) drives the support (2) close to or away from the connector (3) such that the connecting port (101) is plugged in or is unplugged from the connector (3), and
wherein the rotating part (4) has a first end (43), a second end (44) opposite to the first end (43), and a middle portion (45) formed between the first end (43) and the second end (44), wherein the first pivot portion (41) is formed at the first end (43), wherein the second pivot portion (42) is formed on the middle portion (45), wherein the rotating part (4) extends from the second end (44) to form a toggle plate (46).

2. The hot plug structure (10) of the electronic peripheral device (100) according to claim 1, wherein the base (1) extends to form two opposite upright plates (15) which are disposed in parallel with the rail direction of the linear way (11), wherein two side plates (25) extend from two ends of the support (2) and are disposed inside of the two upright plates (15).

3. The hot plug structure (10) of the electronic peripheral device (100) according to claim 1, further comprising a first pivot pin (5) and a second pivot pin (6), wherein the base (1) has a through-hole (12), wherein the support (2) has a hole (21), wherein the first pivot portion (41) is a first opening (411) formed at the first end (43), wherein the second pivot portion (42) is a second opening (421) formed on the middle portion (45), wherein the first pivot pin (5) is pivoted into the first opening (411) and the through-hole (12), wherein the second pivot pin (6) is pivoted into the hole (21) and the second opening (421).

4. The hot plug structure (10) of the electronic peripheral device (100) according to claim 1, wherein the support (2) has a latch portion (22), wherein the rotating part (4) has an engaging portion (47), wherein the engaging portion (47) can be latched in the latch portion (22) correspondingly.

5. The hot plug structure (10) of the electronic peripheral device (100) according to claim 4, wherein the latch portion (22) is a latch slot (221) formed on the support (2), wherein the engaging portion (47) is a latch (471) extending from the rotating part (4), wherein the latch (471) can be latched in the latch slot (221) correspondingly.

6. The hot plug structure (10) of the electronic peripheral device (100) according to claim 1, wherein the support (2) extends away from the base (1) to form a protruding plate (23), wherein a recess (231) is formed between the base (1) and the protruding plate (23), wherein the rotating part (4) can be received in the recess (231) and fitted between the base (1) and the support (2).

7. The hot plug structure (10) of the electronic peripheral device (100) according to claim 6, wherein the base (1) extends towards the recess (231) to form a stopping block (16) which can stop the rotating part (4).

8. The hot plug structure (10) of the electronic peripheral device (100) according to claim 1, further comprising a first fastener (7) and a second fastener (8), wherein the base (1) has a first fixing hole (13) and a second fixing hole (14), wherein the linear way (11) is composed of the first fastener (7) passing in and fixed to the first fixing hole (13) and the second fastener (8) passing in and fixed to the second fixing hole (14), wherein the support (2) has a through slot (24) via which the support (2) is hitched to the externals of the first fastener (7) and the second fastener (8) and is moveable with respect to the first fastener (7) and the second fastener (8).

9. The hot plug structure (10) of the electronic peripheral device (100) according to claim 8, wherein a first inner edge (241) and a second inner edge (242) are formed at two ends of the through slot (24) of the support (2), wherein the first inner edge (241) and the first fastener (7) can engage with each other, wherein the second inner edge (242) and the second fastener (8) can engage with each other.

10. The hot plug structure (10) of the electronic peripheral device (100) according to claim 8, wherein a rail direction of the linear way (11) is a connecting line (L1) defined by the first fastener (7) and the second fastener (8).

11. The hot plug structure (10) of the electronic peripheral device (100) according to claim 2, wherein the two upright plates (15) have two opposite protrusions (151) and two opposite cuts (152), wherein the two side plates (25) have two opposite spring members (251), each of the spring members (251) extending away from the corresponding upright plate (15) to form a bump (252), wherein the two protrusions (151) can contact against the two spring members (251).

\* \* \* \* \*